United States Patent [19]

Picache

[11] Patent Number: 5,664,101
[45] Date of Patent: Sep. 2, 1997

US005664101A

[54] INTELLIGENT INDUSTRIAL LOCAL AREA NETWORK MODULE FOR USE IN A DISTRIBUTED CONTROL SYSTEM

[75] Inventor: Gabriel P. Picache, Somersworth, N.H.

[73] Assignee: Heidelberg Druckmaschinen AG, Heidelberg, Germany

[21] Appl. No.: 171,532

[22] Filed: Dec. 22, 1993

[51] Int. Cl.$^6$ .................................................. G06F 15/00
[52] U.S. Cl. ...................... 395/200.8; 101/183; 101/365; 395/882; 370/463
[58] Field of Search .............................. 395/200.01, 145, 395/275; 101/365; 364/200; 370/85.5

[56] References Cited

U.S. PATENT DOCUMENTS

| | | | |
|---|---|---|---|
| 4,780,814 | 10/1988 | Hayek | 364/200 |
| 4,809,217 | 2/1989 | Floro et al. | 364/900 |
| 4,955,290 | 9/1990 | Kipphan et al. | 101/183 |
| 4,977,831 | 12/1990 | Walter | 101/365 |
| 5,151,895 | 9/1992 | Vacon et al. | 370/85.1 |
| 5,321,816 | 6/1994 | Rogan et al. | 395/200 |
| 5,423,457 | 6/1995 | Nicholas et al. | 222/62 |

*Primary Examiner*—Thomas C. Lee
*Assistant Examiner*—Terance J. Stanton
*Attorney, Agent, or Firm*—Tarolli, Sundheim, Covell, Tummino & Szabo

[57] ABSTRACT

An industrial local area network module comprises a transceiver for supporting communication between the module and a communications network in a first data format. The module further comprises a parallel interface for supporting communication between the module and a respective embedded controller in a second data format. A microcontroller is provided for (i) controlling the orderly flow of messages between the module and the communications network through the transceiver and (ii) controlling the orderly flow of messages between the module and the embedded controller through the parallel interface. A memory stores program instructions to be retrieved by the microcontroller and then executed by the microcontroller to control the orderly flow of messages between the module and the communications network through the transceiver and to control orderly flow of messages between the module and the embedded controller through the parallel interface.

24 Claims, 3 Drawing Sheets

INTELLIGENT INDUSTRIAL LOCAL AREA NETWORK MODULE FOR USE IN A DISTRIBUTED CONTROL SYSTEM

TECHNICAL FIELD

The present invention relates to distributed control systems and is particularly directed to an intelligent industrial local area network module for use in a distributed control system.

BACKGROUND ART

Distributed control systems are known. A typical distributed control system includes a host controller and a plurality of isolated controllers which communicate with the host controller through a local area network. The isolated controllers may include controllers embedded in machinery. Each of the isolated controllers and/or embedded controllers has the capability of relaying information gathered from sensing devices and/or actuating devices to the host controller which usually acts as an operator interface. The information may also be relayed to a monitoring system which can act as a redundant low-level operator interface.

Different local area networks have been employed in industrial environments, i.e., surroundings with above normal electrical noise and relatively harsh physical conditions that can significantly degrade the performance of local area networks. Examples of different versions of industrial local area networks are disclosed in U.S. Pat. Nos. 4,517,637; 4,888,726; and 4,901,218.

In some known distributed control systems which use industrial local area networks, the "instantaneous" network response time may range from a few seconds to several minutes because of software overhead associated with the host controller and/or isolated controllers of the particular distributed control system. A problem associated with these known distributed control systems is that the relatively long network response times are unacceptable in real time control applications requiring response times measured in milliseconds. Another problem associated with some known distributed control systems is their lack of modularity which would provide flexibility and variety in use.

U.S. Pat. No. 4,517,637 discloses a single control processor which handles both communications and control functions. The design of the local area network disclosed in U.S. Pat. No. 4,517,637 lacks modularity as well as distributed intelligence in network handling. Also, the cost and time to install the local area network are relatively high since two shielded twisted pairs of wire cable are used for a communication medium.

U.S. Pat. No. 4,888,726 discloses a controller including a controller section and a communications section which shares memory with the controller section. The design of the local area network disclosed in U.S. Pat. No. 4,888,726 provides distributed intelligence but lacks modularity since the design cannot be applied to a control arrangement in which memory resources cannot be shared.

U.S. Pat. No. 4,901,218 discloses a communications adaptor which provides distributed intelligence and modularity. A controller is operatively connected to a machine which is controlled by the controller. The controller has a processor and is connected through a serial link to the communications adaptor which, in turn, is connected to a local area network. The communications adaptor is modular since it has its own processor which is separate from the processor of the controller. The processor of the controller provides the control functions to control the machine operatively connected to the controller. The processor of the communications adaptor provides the communications functions between the controller and the local area network. Although the distributed control system disclosed in U.S. Pat. No. 4,901,218 has distributed intelligence and modularity, the network response time is significantly degraded because of the relatively slower transmission rates through the serial link between the controller and the communications adaptor. The transmission rates through this serial link is much slower than transmission rates through the industrial local area network. Moreover, the industrial local area network disclosed in U.S. Pat. No. 4,901,218 requires a network manager, thereby further increasing the cost to implement the industrial local area network.

SUMMARY OF THE INVENTION

The present invention is directed to an intelligent industrial local area network module for use in a distributed control system. In accordance with the present invention, an intelligent industrial local area network module is provided for use in a distributed control system having a host controller and at least two industrial controllers which communicate with the host controller through a communications network. The module comprises transceiver means for supporting communication between the module and the communications network in a first data format. Parallel interface means is provided for supporting communication between the module and one of the industrial controllers in a second data format. Microcontroller means is provided for (i) controlling the orderly flow of messages between the module and the communications network through the transceiver means, and (ii) controlling the orderly flow of messages between the module and the one industrial controller through the parallel interface means. Memory means is provided for storing program instructions to be retrieved by the microcontroller means and then executed by the microcontroller means to control the orderly flow of messages between the module and the communications network through the transceiver means and to control orderly flow of messages between the module and the one industrial controller through the parallel interface means.

The intelligent industrial local area network module is particularly useful in a distributed printing press control system to control a number of ink key actuators. The distributed printing press control system comprises an industrial controller and at least one printing unit including a plurality of ink fountain assemblies and a number of embedded controllers equal to the number of ink fountain assemblies. A communications network daisy chains from ink fountain assembly to ink fountain assembly and from printing unit to printing unit to interlink the embedded controllers and the industrial controller. Input/output means is interconnected with the embedded controllers and the ink key actuators to enable the embedded controllers to monitor and control the ink key actuators. An industrial local area network module is associated with each embedded controller for enabling the embedded controller to communicate with the industrial controller and other embedded controllers and to control ink key actuators associated with the particular embedded controller.

The present invention is also directed to a method of sending a message packet from a source control module to a destination control module. In accordance with the present invention, the method comprises the steps of providing a message packet at the source control module which comprises (i) a message field, (ii) a packet length field, and (iii)

a destination node field, sending the message packet from the source control module to a first intelligent local area network module, modifying the message packet at the first intelligent local area network module to include a transmit buffer number field and a source node field, transmitting the modified message packet at the first intelligent local area network module to a second intelligent local area network module, and modifying the message packet at the second intelligent local area network module to remove the buffer number field and the destination node field and thereby to provide a final message packet comprising (i) the message field, (ii) the packet length field, and (iii) the source node field.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENT

Figure 1:
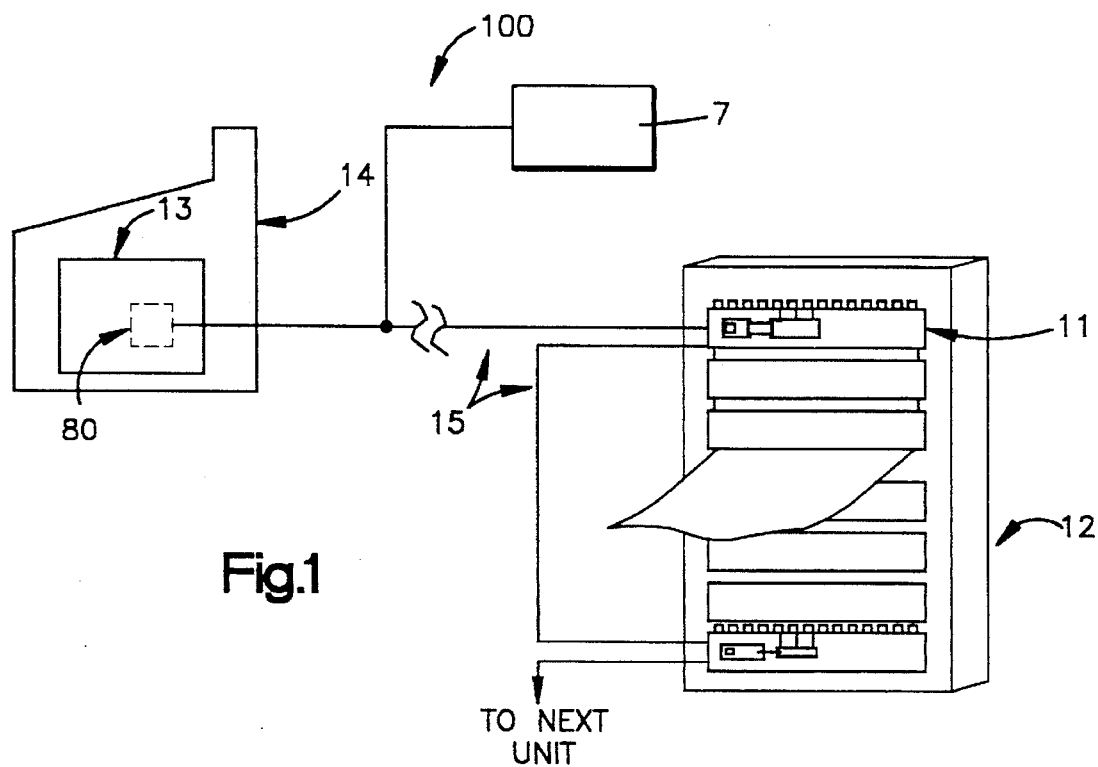
FIG. 1 is a schematic diagram of a distributed printing press color control system embodying an intelligent industrial local area network module constructed in accordance with the present invention.

The present invention is directed to an intelligent industrial local area network module for use in a distributed control system. The specific construction of the intelligent industrial local area network module may vary. By way of example, a number of intelligent industrial local area network modules constructed in accordance with the present invention are embodied in a distributed printing press color control system 100 as illustrated in FIG. 1.

The distributed printing press color control system 100 comprises a host controller 13 located within a console 14. The host controller 13 may be an industrial PC, for example. An intelligent local area network module 80 is associated with the host controller 13.

Figure 2:
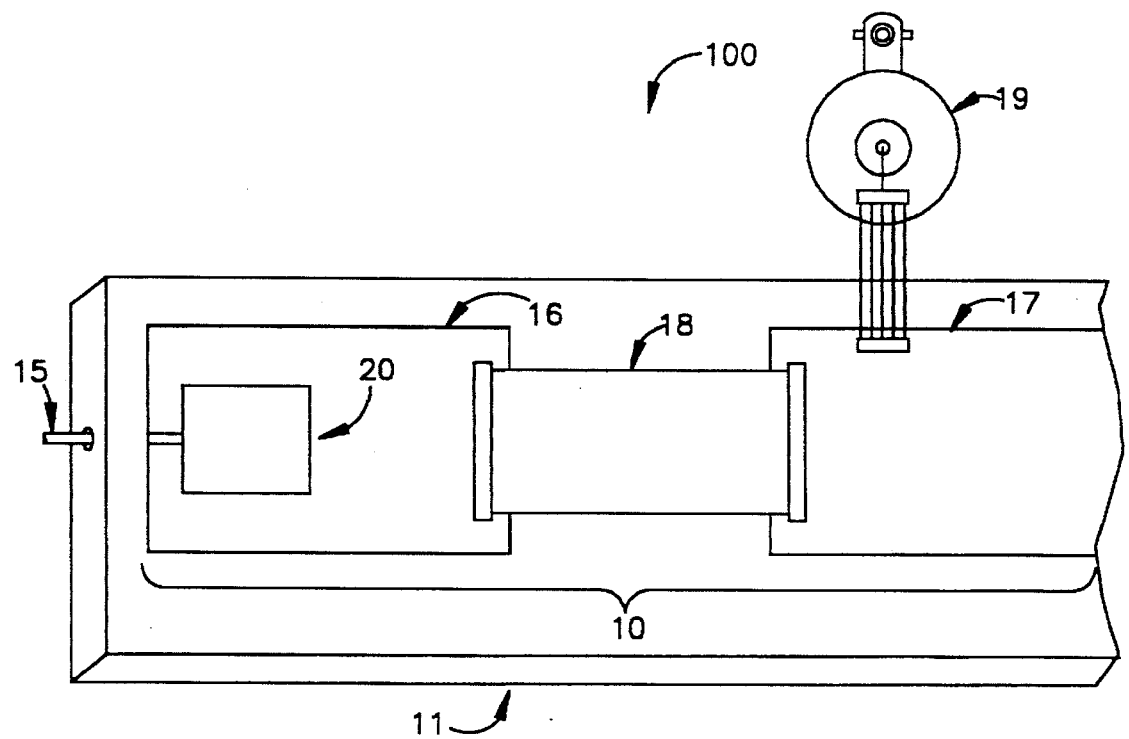
FIG. 2 is an enlarged view of a portion of the distributed printing press color system of FIG. 1.

One of the ink fountain assemblies is shown in enlarged detail in FIG. 2, and is designated with reference numeral 11. The structure and operation of the other ink fountain assemblies are the same as the structure and operation of the ink fountain assembly 11 shown in FIG. 2. Therefore, for simplicity, only the structure and operation of the ink fountain assembly 11 illustrated in FIG. 2 will be described in detail.

The ink fountain assembly 11 shown in FIG. 2 comprises an embedded controller 10 to which a number of ink key actuators 19 may be connected. More specifically, the embedded controller 10 includes a control module 16, an input/output module 17 having I/O ports to which the ink key actuators 19 are connectable, and a ribbon cable 18 interconnecting the input/output module 17 and the control module 16.

In accordance with the present invention, an intelligent industrial local area network module 20 (FIG. 2) is associated with the control module 16. The industrial module 20 communicates through a single shielded twisted pair of wire cable 15 with the industrial module 80 associated with the host controller 13 and with other industrial modules associated with other control modules of other ink fountain assemblies. The industrial module 20 accepts messages from the control module 16 or the host controller 13 which initialize the industrial local area network parameters such as baud rate, addresses, acknowledge scheme, slot times, etc. Network parameters of the industrial module 20 are programmable from either the control module 16 or the host controller 13.

Figure 3:
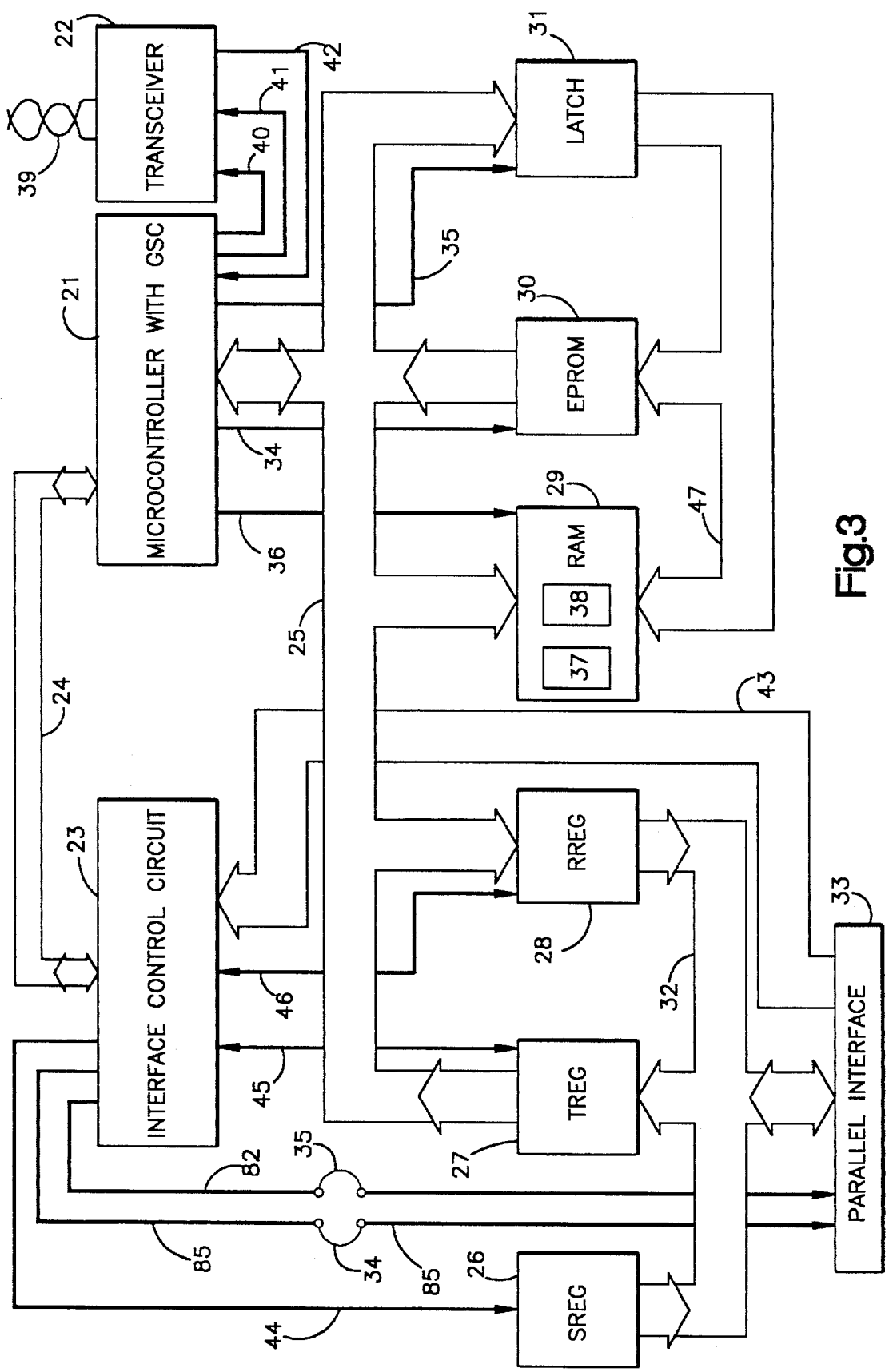
FIG. 3 is a block diagram of the intelligent industrial local area network module of FIGS. 1 and 2.

Referring to FIG. 3, the industrial module 20 comprises (i) a microcontroller with a Global Serial Channel 21, (ii) external memories and buffers, (iii) a transceiver 22, and (iv) a parallel interface 33 and an interface control circuit 23. Traffic control for messages to and from an industrial local area network (LAN), as well as messages to and from a mother module (the mother module could be any control module 16, or the host Controller 13) is performed by the microcontroller 21 which is an 80C152JA manufactured by Intel Corporation. It is an eight bit microcontroller with a multiprotocol Global Serial Channel (GSC) which can accommodate CSMA/CD, SDLC, and any other user-defined protocol.

The microcontroller 21 reads its program instructions provided by an erasable programmable read only memory (EPROM) 30. The block diagram of FIG. 3 illustrates memory management circuitry comprising the EPROM 30, latch 31, address/data (A/D) lines 25, an external static read write memory (RAM) 29, and a set of memory management control lines 34, 35, 36. The RAM 29 includes a receive buffer 37 and a transmit buffer 38. Using the A/D lines 25 and the control line 36, the microcontroller 21 can store messages in the RAM 29. The RAM 29 has enough memory storage for up to sixteen messages from the network (meant for the mother module) in the receive buffer 37 and up to sixteen messages for the network (sent from the mother module) in the transmit buffer 38. Each message can be up to 256 bytes long. The transmit buffer 38 ensures that the mother module does not get bogged down waiting to send a message out to the network, and the receive buffer 37 ensures that no messages are lost if the mother module is too slow or too busy to read a message packet from the network.

The transceiver 22 is the means by which the microcontroller 21 sends out and receives messages to and from the network. Before the microcontroller 21 sends out a message packet serially on a transmit line 41, it sends an enable signal on a driver control line 40 to activate a transmitter portion (not shown) of the transceiver 22 for the duration of the transmission. A receiver portion (also not shown) of the transceiver 22 sends message packets from the network to the microcontroller 21 using a receive line 42. The receiver portion is coupled to the transmitter portion in the transceiver 22 so that collisions in the network could be automatically detected by the microcontroller 21. The transceiver 22 uses a single shielded twisted pair of wire cables 39 for a network medium. It is known in the art that such a medium offers good electrical noise immunity for industrial local area networks.

The microcontroller 21 handles message packets exchanged with the mother module via the interface control unit 23, a status register (SREG) 26, a transmit register (TREG) 27, and a receive register (RREG) 28. A set of interface control lines 24 interconnect the microcontroller 21 and the interface control circuit 23. Control lines 44, 45, 46 interconnect the interface control unit 23 and the registers 26, 27, 28, respectively. Parallel interface data lines 32 interconnect SREG 26, REG 27, RREG 28, and the parallel interface 33. A set of control lines 43 interconnect the parallel interface 33 and the interface control circuit 23.

If the industrial module 20 is designed to be physically disconnected (as a separate board) from the mother module, then the parallel interface 33 is a connector which could be an iSBX parallel bus interface, an IBM PC/AT bus interface, or any similar interface. If the industrial module 20 is to be designed as part of a system, the parallel interface 33 would simply be the system address and data bus, with relevant control lines.

How the Mother Module Sends a Packet Out to the Network

Through the parallel interface 33, the mother module reads a status byte from an I/O location corresponding to SREG 26. Decoding the status byte determines if the industrial module 20 is ready to accept a packet byte from the mother module. Another way of determining this without having to read and decode the status byte is to connect the interrupt jumper 34 on a control line 85 from the interface control circuit 23 to the parallel interface 33. This way, the industrial module 20 interrupts the mother module when it is ready to receive a message packet.

When the industrial module 20 is ready, the mother module writes the first byte of the packet to an I/O location that stores the byte in TREG 27, changes the status byte, and interrupts the microcontroller 21 via the set of interface control lines 24. The microcontroller 21 reads in the byte from TREG 27, transfers it to a free transmit buffer 38 in RAM 29, and then changes the status byte in SREG 26 using the interface control circuit 23 or informs the mother module by interrupt if the interrupt jumper 34 is connected.

This sequence is repeated until all bytes of the packet are sent to the industrial module 20. The last byte of the message packet is written into a different I/O location that stores the byte in TREG 27, interrupts the microcontroller 21, changes the status byte in SREG 26, and indicates to the microcontroller 21 that the byte in TREG 27 is the last byte of the message packet. This action causes the microcontroller 21 to transfer the last byte of TREG 27 to the transmit buffer 38 and prepare the next available transmit buffer to accept another message packet.

The mother module can send message packets one right after another. One of the objectives of the design of the industrial module 20 is to send those packets out to the network as quickly as possible. The microcontroller 21 detects if there are any packets awaiting transmission to the network, and if there are, it sends the contents of the transmit buffers 38 serially to the transceiver 22. The packets are transmitted to the network via a daisy-chained shielded twisted pair of wire cables 39.

How the Industrial Local Area Network Module Sends a Packet to Its Mother Module A message packet meant for the node number of the mother module is automatically received by the GSC of the microcontroller 21. The way this is done is detailed in U.S. Pat. No. 4,780,814.

The microcontroller 21 has an internal DMA controller (not shown). Through its internal DMA controller, the microcontroller 21 stores the packet in an available receive buffer 37 in the RAM 29. Message packets meant for the mother module can come one right after another, and they will be buffered in the RAM 29 so that no message packets are lost due to overrun.

When the microcontroller 21 detects a queued up packet in the receive buffer 37, it reads the first byte of the packet, transfers it to RREG 28, and sets up the status byte in SREG 26 which indicates to the mother module that there is a packet received from the network. The mother module can occasionally read and decode the status byte of SREG 26 to determine if a packet was received from the network. If this method of polling SREG 26 is neither adequate nor desired, another interrupt jumper 35 can be connected on a control line 82 from the interface control circuit 23 to the parallel interface 33. This way, the mother module is interrupted whenever a packet is received by the industrial module 20.

Before the mother module reads RREG 28, it should read SREG 26 and decode the status byte to determine if the byte in RREG 28 is the last byte of the message. If it is not the last byte, the mother module then reads RREG 28, and this act of reading is detected by the interface control circuit 23 so that RREG 28 will release the message packet byte to the parallel interface data lines 32. The microcontroller 21 sets up the next packet byte in RREG 28 and perform any changes to the status byte in SREG 26.

The above procedure is repeated until the last byte of the message packet is written in RREG 28 by the microcontroller 21. In this last case, the microcontroller 21 sets up the status byte in SREG 26 so that the mother module will know that the byte in RREG 28 is the last byte of the packet. After reading in the last byte, the mother module can act upon the complete message packet accordingly.

Industrial Local Area Network Module Protocol

The industrial module 20 supports CSMA/CD, SDLC, and other user-defined protocols. The industrial module 20 has the intelligence to attend to all communications related processing without the help of the processor of its mother module. The mother module only has to read in the message from the network, if any.

Figure 4:
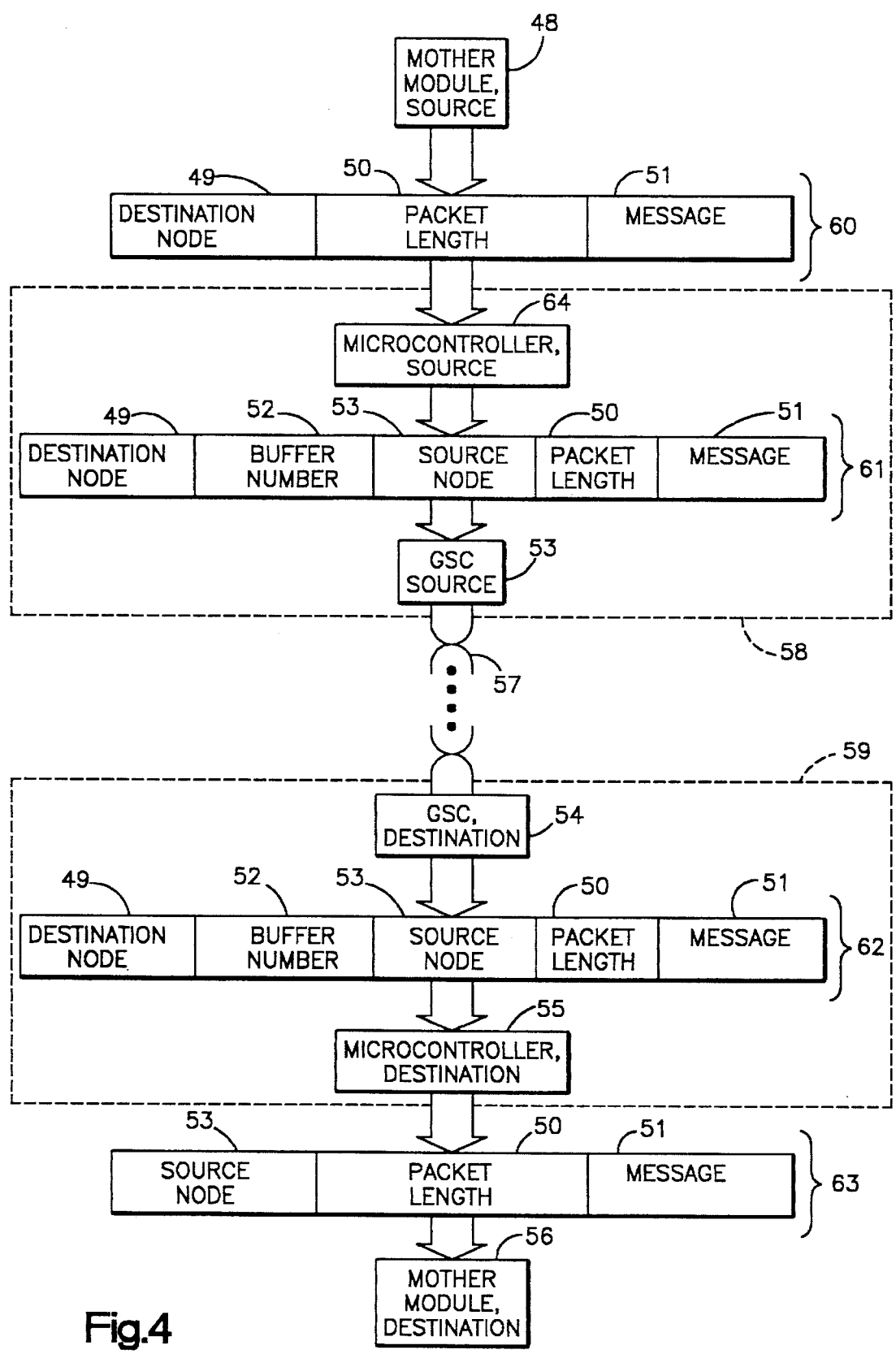
FIG. 4 is a diagram illustrating a protocol procedure associated with the intelligent industrial local area network module of FIG. 3.

The following definition of protocol procedures dictate the structure of a message packet. FIG. 4 shows how a message packet dynamically changes as it is passed from a source mother module 48 to a destination mother module 56 through the industrial modules 58, 59 and the network. In the following example, the industrial module 58 is the transmitting module, and the industrial module 59 is the receiving module.

When the mother module 48 sends a complete packet 60 out to the network, it has to follow a simple message protocol structure that contains a destination node field 49, a length of packet field 50, and a message field 51 which contains data or coded instructions. This message structure is passed to the microcontroller 64 which then modifies the message structure to include a source node field 53 and a transmit buffer number field 52. An explanation of each field is given below.

Each of the industrial modules 58, 59 is assigned a unique node address upon initialization. In order for the transmitting industrial module 58 to properly transmit a packet 60, its mother module 48 provides the destination node 49 as one of the fields of the packet 60 so that the module 58 will know where to send the packet 60. The mother module 48 also provides the packet length 50 which is used by the microcontroller 64 for error checking during parallel interface message transfers. The message field 51 is the information content that the packet 60 contains. Both the destination node field 49 and the packet length field 50 consist of one byte each. Therefore, the protocol overhead between the mother module 48 and the industrial module 58 is as short as two bytes. This small overhead is important for distributed networks to ensure rapid control response times.

The microcontroller 64 of the industrial module 58 adds two new fields to the original packet 60 such that a new packet 61 is created. The two new fields are the transmit buffer number field 52 which is used for error checking purposes at the receiving industrial module 59, and the source node field 53 which carries the node address of the transmitting industrial module 58. The microcontroller 64 assembles the new message packet 61 and sends it to its on-chip Global Serial Channel (GSC) 53 which transmits it out to the network on a shielded twisted pair of wire cables 57 to the receiving industrial module 59.

The receiving industrial module 59 has a GSC 54 that extracts a message packet 62 from the network only if the destination node 49 corresponds to its unique address. The message packet 62 is passed on to its microcontroller 55 which extracts the final message packet 63 from the message packet 62. The final message packet 63 is the same as the message packet 62 less the buffer number field 52 and the destination node field 49. The buffer number field 52 and the destination node field 49 are removed and are not contained in the final message packet 63. Note that the final message packet 63 is the same as the original packet 60 except that the destination node field 49 has been replaced by the source node field 53. Furthermore, note that the short, two-byte protocol overhead is maintained between the receiving industrial module 59 and its mother module 56.

Since the industrial module 20 needs only two bytes as protocol overhead between itself and its mother module, network response times should be improved, especially for those applications requiring response times of only milliseconds.

Referring again to FIGS. 1-3, it should be apparent that the intelligent industrial module 20 is usable in any distributed control system. It is contemplated that with any personal computer (PC) and proper software, the module 20 may be used as an industrial local area network monitor by configuring the GSC of a microcontroller to operate in "promiscuous mode" as described in detail in U.S. Pat. No. 4,780,814.

A PC with the industrial module 20 is sufficient hardware to implement an industrial local area network monitor 7, as shown in FIG. 1. An initialization message sent by the PC can put the industrial module 20 into a "promiscuous mode" such that the module 20 will receive every message sent to the network. A short driver program can be written to echo all messages received into the PC's video display. The industrial monitor 7 can also send diagnostic commands to the industrial local area network nodes, thereby enabling an operator to see communications status reports from the nodes.

The GSC allows CSMA/CD, SDLC, and other user-defined protocols to be established within the industrial local area network. This makes the industrial module 20 quite versatile in dealing with various low-level protocols that have been developed for serial links.

The GSC also has a broadcast mode that allows the industrial module 20 to send message packets to all nodes in the network and a group broadcast mode that sends message packets to a particular group of nodes in the network.

A number of advantages result by using the intelligent industrial module 20 in a distributed control system. Since the industrial module 20 does not share memory with its mother module and has its own memory for buffer management which memory can be easily accessed by its mother module through a parallel interface, the module 20 can be used in any control module (or host controller) design and, therefore, is modular. Another advantage is that network response time is substantially improved since (i) the microcontroller 21 off-loads time-consuming duties for supporting local area network communications processing from the control module 16 and the host controller 13, (ii) a minimum number of overhead protocol bytes is used to transfer a message between the control module 16 and the host controller 13, and (iii) the industrial module 20 uses a parallel interface between itself and the control module 16 (or the host controller 13) instead of a slow serial link. Still another advantage is that the industrial module 20 needs no network manager because the capability to manage the network is resident in each module. The module is able to detect collisions and carriers, and it automatically backs off and retransmits when necessary. The industrial module 20 also has the capability to inform the control module 16 or host controller 13 that a node has lost the capability to respond to messages.

Also, the cost of materials of the industrial local area network and the cost of installing the industrial local area network are relatively inexpensive since only one shielded twisted pair of wire cables 15 is used. Carrier and message signals are passed through the same pair of wires. The cost of the industrial module 20 is also relatively inexpensive since only eight integrated chips are used.

From the above description of the invention, those skilled in the art of the present invention will perceive improvements, changes and modifications. Such improvements, changes and modifications within the skill of the art of the present invention are intended to be covered by the appended claims.

Having described the invention, the following is claimed:

1. An intelligent industrial local area network module for use in a distributed control system, said distributed control system comprising a host controller and at least two industrial controllers each having a said module, said industrial controllers communicating with each other and the host controller through a communications network, said modules managing all network communications for their respective industrial controller on said communicating network, each of said module comprising:

transceiver means for supporting all communication between the module and the communications network in a first data format;

parallel interface means for supporting all communication between the module and one of the industrial controllers in a second data format;

microcontroller means for (i) controlling the orderly flow of messages between the module and the communications network through the transceiver means, and (ii) controlling the orderly flow of messages between the module and the one industrial controller through the parallel interface means; and memory means for storing program instructions to be retrieved by the microcontroller means and then executed by the microcontroller means to control the orderly flow of messages between the module and the communications network through the transceiver means and to control orderly flow of messages between the module and the one industrial controller through the parallel interface means.

2. An intelligent industrial local area network module according to claim 1 wherein said transceiver means includes a single shielded twisted pair of wire cables which connects with the communications network.

3. An intelligent industrial local area network module according to claim 1 wherein said parallel interface means includes a connector which is an iSBX parallel bus interface.

4. An intelligent industrial local area network module according to claim 1 wherein said parallel interface means includes a connector which is an IBM PC/AT bus interface.

5. An intelligent industrial local area network module according to claim 1 wherein said microcontroller means includes an eight bit microcontroller with a global serial channel which can accommodate CSMA/CD, SDLC, and any other user-defined protocol.

6. An intelligent industrial local area network module according to claim 1 wherein said memory means comprises (i) a latch, (ii) an EPROM, (iii) RAM including a receive buffer and a transmit buffer, and (iv) a number of control lines interconnecting the latch, the EPROM, and the RAM including the receive buffer and the transmit buffer.

7. A distributed control system comprising:
 a host controller including means for transmitting and receiving data in a first data format;
 a plurality of industrial controllers for controlling respective devices, each of the industrial controllers including means for transmitting and receiving data in a second data format;
 a communications network coupled to the host controller and for enabling messages containing data in the first data format to be transmitted and received thereon;
 a first intelligent industrial LAN-module coupled between the communications network and one of the industrial controllers; and
 a second intelligent industrial LAN-module coupled between the communication network and another one of the industrial controllers;
 said intelligent industrial LAN-modules managing all communications on said network between said one of the industrial controllers and said another one of the industrial controllers;
 each of the intelligent industrial LAN-modules comprising:
  (1) transceiver means for supporting all communication between the respective intelligent industrial LAN-module and the communications network;
  (2) parallel interface means for supporting all communication between the respective intelligent industrial LAN-module and the respective industrial controller;
  (3) microcontroller means for (i) controlling the orderly flow of messages between the respective intelligent industrial LAN-module and the communications network through the transceiver means, and (ii) controlling the orderly flow of messages between the respective intelligent industrial LAN-module and the respective industrial controller through the parallel interface means; and
  (4) memory means for storing program instructions to be retrieved by the microcontroller means and then executed by the microcontroller means to control the orderly flow of messages between the respective intelligent industrial LAN-module and the communications network through the transceiver means and to control the orderly flow of messages between the respective intelligent industrial LAN-module and the respective industrial controller through the parallel interface means.

8. A distributed control system according to claim 7 wherein said transceiver means includes a single shielded twisted pair of wire cables which connects with the communications network.

9. A distributed control system according to claim 7 wherein said parallel interface means includes a connector which is an iSBX parallel bus interface.

10. A distributed control system according to claim 7 wherein said parallel interface means includes a connector which is an IBM PC/AT bus interface.

11. A distributed control system according to claim 7 wherein said microcontroller means includes an eight bit microcontroller with a global serial channel which can accommodate CSMA/CD, SDLC, and any other user-defined protocol.

12. A distributed control system according to claim 7 wherein said memory means comprises (i) a latch, (ii) an EPROM, (iii) RAM including a receive buffer and a transmit buffer, and (iv) a number of control lines interconnecting the latch, the EPROM, and the RAM including the receive buffer and the transmit buffer.

13. A distributed control system according to claim 7 further comprising a third intelligent industrial module coupled between the host controller and the communications network and cooperating with the host controller to monitor the communications network.

14. A distributed control system according to claim 13 wherein the host controller is a personal computer.

15. A distributed control system according to claim 7 further comprising (i) a personal computer, and (ii) a third intelligent industrial module coupled between the personal computer and the communications network and cooperating with the personal computer to monitor the communications network.

16. A distributed printing press color control system for controlling a number of ink key actuators, said system comprising:
 a host controller;
 at least one printing unit including a plurality of ink fountain assemblies and a number of embedded controllers equal to the number of ink fountain assemblies;
 a communications network which daisy chains from ink fountain assembly to ink fountain assembly and from printing unit to printing unit to interlink the embedded controllers and the host controller;
 input/output means interconnected with the embedded controllers and the ink key actuators to enable the embedded controllers to monitor and control the ink key actuators;
 an industrial local area network module associated with each embedded controller for enabling the embedded controller to communicate with the host controller and other embedded controllers for controlling ink key actuators associated with the particular embedded controller, said local area network modules managing all network communications for their respective interlinked embedded controller coupled to said communications network;
 the industrial local area network module comprising:
  (1) transceiver means for supporting all communication between the module and the communications network in a first data format;
  (2) parallel interface means for supporting all communication between the module and the respective embedded controller in a second data format;
  (3) microcontroller means for (i) controlling the orderly flow of messages between the module and the communications network through the transceiver means, and (ii) controlling the orderly flow of messages between the module and the embedded controller through the parallel interface means; and
  (4) memory means for storing program instructions to be retrieved by the microcontroller means and then executed by the microcontroller means to control the orderly flow of messages between the module and the communications network through the transceiver means and to control orderly flow of messages between the module and the embedded controller through the parallel interface means.

17. A distributed printing press color control system according to claim 16 wherein said transceiver means includes a single shielded twisted pair of wire cables which connects with the communications network.

18. A distributed printing press color control system according to claim 16 wherein said parallel interface means includes a connector which is an iSBX parallel bus interface.

19. A distributed printing press color control system according to claim 16 wherein said parallel interface means includes a connector which is an IBM PC/AT bus interface.

20. A distributed printing press color control system according to claim 16 wherein said microcontroller means includes an eight bit microcontroller with a global serial channel which can accommodate CSMA/CD, SDLC, and any other user-defined protocol.

21. A distributed printing press color control system according to claim 16 wherein said memory means comprises (i) a latch, (ii) an EPROM, (iii) RAM including a receive buffer and a transmit buffer, and (iv) a number of control lines interconnecting the latch, the EPROM, and the RAM including the receive buffer and the transmit buffer.

22. A distributed printing press color control system according to claim 16 further comprising an industrial local area network module associated with the industrial controller and cooperating with the industrial controller to monitor the communications network, the industrial local area network module associated with the industrial controller having the same structure as the industrial local area network module associated with each embedded controller.

23. A distributed printing press color control system according to claim 22 wherein the industrial controller is a personal computer.

24. A distributed printing press color control system according to claim 16 further comprising (i) a personal computer, and (ii) an industrial local area network module associated with the personal computer and cooperating with the personal computer to monitor the communications network, the industrial local area network module associated with the personal computer having the same structure as the industrial local area network module associated with each embedded controller.

\* \* \* \* \*